US009877500B2

(12) United States Patent
Lee et al.

(10) Patent No.: US 9,877,500 B2
(45) Date of Patent: Jan. 30, 2018

(54) NATURAL BEVERAGE PRODUCTS

(75) Inventors: Thomas Lee, Scarsdale, NY (US); Pei K. Chang, Cortlandt Manor, NY (US); Fari Talebi, New York, NY (US); Todd A. Zaniewski, Sandy Hook, CT (US); Manuel Antonio Arce Garcia, Ossining, NY (US); Hang Chen, White Plains, NY (US)

(73) Assignee: CONCENTRATE MANUFACTURING COMPANY OF IRELAND, Hamilton (BM)

( * ) Notice: Subject to any disclaimer, the term of this patent is extended or adjusted under 35 U.S.C. 154(b) by 1454 days.

(21) Appl. No.: 11/686,305

(22) Filed: Mar. 14, 2007

(65) Prior Publication Data
US 2008/0226797 A1  Sep. 18, 2008

(51) Int. Cl.
A23L 2/00 (2006.01)
A23L 2/38 (2006.01)
A23L 1/221 (2006.01)
A23L 2/60 (2006.01)
A23L 2/54 (2006.01)
A23L 2/68 (2006.01)

(52) U.S. Cl.
CPC ............... *A23L 2/60* (2013.01); *A23L 2/54* (2013.01); *A23L 2/68* (2013.01); *A23V 2002/00* (2013.01)

(58) Field of Classification Search
CPC ................ A23L 2/60; A23L 2/68; A23L 2/54
USPC .................................................. 426/590, 650
See application file for complete search history.

(56) References Cited

U.S. PATENT DOCUMENTS

| | | | |
|---|---|---|---|
| 3,510,310 A * | 5/1970 | Breckwoldt | 426/548 |
| 3,531,296 A | 9/1970 | Smithies | |
| 4,061,797 A | 12/1977 | Hannan, Jr. et al. | |
| 4,082,858 A | 4/1978 | Morita et al. | |
| 4,118,516 A * | 10/1978 | Van Praag et al. | 426/96 |
| 4,361,697 A | 11/1982 | Dobberstein et al. | |
| 4,612,205 A | 9/1986 | Kupper et al. | |
| 4,612,942 A | 9/1986 | Dobberstein et al. | |
| 4,693,902 A * | 9/1987 | Richmond et al. | 426/407 |
| 4,738,856 A | 4/1988 | Clark | |
| 4,830,862 A | 5/1989 | Braun et al. | |
| 4,830,870 A | 5/1989 | Davis, Jr. et al. | |
| 4,870,059 A | 9/1989 | Mitsuhashi et al. | |
| 4,902,525 A | 2/1990 | Kondou | |
| 4,956,191 A | 9/1990 | Ueda et al. | |
| 4,959,225 A | 9/1990 | Wong et al. | |
| 4,990,354 A | 2/1991 | Bakal et al. | |
| 4,992,279 A | 2/1991 | Palmer et al. | |
| 4,996,196 A | 2/1991 | Mitsuhashi et al. | |
| 5,013,716 A | 5/1991 | Cherukuri et al. | |
| 5,059,428 A | 10/1991 | Wong et al. | |
| 5,059,429 A | 10/1991 | Cherukuri et al. | |
| 5,106,644 A | 4/1992 | El-Nokaly | |
| 5,219,842 A | 6/1993 | Okada et al. | |
| 5,411,755 A | 5/1995 | Downton et al. | |
| 5,411,775 A | 5/1995 | Wilson | |
| 5,417,994 A | 5/1995 | Chang et al. | |
| 5,433,965 A | 7/1995 | Fischer et al. | |
| 5,437,880 A | 8/1995 | Takaichi et al. | |
| 5,464,619 A | 11/1995 | Kuznicki et al. | |
| 5,480,667 A | 1/1996 | Corrigan et al. | |
| 5,631,038 A | 5/1997 | Kurtz et al. | |
| 5,637,618 A | 6/1997 | Kurtz et al. | |
| 5,643,956 A | 7/1997 | Kurtz et al. | |
| 5,646,122 A | 7/1997 | Kurtz et al. | |
| 5,650,403 A | 7/1997 | Kurtz et al. | |
| 5,654,311 A | 8/1997 | Kurtz et al. | |
| 5,665,755 A | 9/1997 | Kurtz et al. | |
| 5,681,569 A | 10/1997 | Kuznicki et al. | |
| 5,700,792 A | 12/1997 | Kurtz et al. | |
| 5,703,053 A | 12/1997 | Kurtz et al. | |
| 5,780,086 A | 7/1998 | Kirksey et al. | |
| 5,817,351 A * | 10/1998 | DeWille et al. | 426/74 |
| 5,827,560 A | 10/1998 | Fu et al. | |
| 5,830,523 A | 11/1998 | Takaichi et al. | |
| 5,851,578 A | 12/1998 | Gandhi | |
| 5,866,608 A | 2/1999 | Kurtz et al. | |
| 5,895,672 A | 4/1999 | Cooper | |
| 5,916,881 A | 6/1999 | Okada et al. | |
| 6,007,856 A | 12/1999 | Cox et al. | |
| 6,008,250 A | 12/1999 | Kurtz et al. | |
| 6,010,734 A | 1/2000 | Whelan et al. | |
| 6,015,792 A | 1/2000 | Kurtz et al. | |
| 6,054,168 A | 4/2000 | Lioutas et al. | |

(Continued)

FOREIGN PATENT DOCUMENTS

| | | |
|---|---|---|
| CN | 1849078 A | 10/2006 |
| EP | 1449832 A1 | 8/2004 |
| JP | 60188035 | 9/1985 |
| JP | S62-3775 A | 1/1987 |
| JP | 62091162 A | 4/1987 |
| JP | H05-3773 A | 1/1993 |
| JP | 8502648 | 3/1996 |
| JP | 9194370 A | 7/1997 |
| JP | 2000-197462 A | 7/2000 |
| JP | 2000-273051 A | 10/2000 |

(Continued)

OTHER PUBLICATIONS

Kinghorn, "Stevie: the genus Stevie," 2002 (no month), Taylor & Francis Inc., p. 186.*
Beverage R&D, IFT Post-Show Report, Aug. 2008, Beverage Industry, vol. 99, No. 8, pp. 49.*
Ash et al., Purac, 2004 (no month), Handbook of Green Chemicals, Second Edition, pp. 990.*

(Continued)

*Primary Examiner* — Lien Tran
*Assistant Examiner* — Tynesha McClain-Coleman
(74) *Attorney, Agent, or Firm* — Sterne, Kessler, Goldstein & Fox PLLC

(57) ABSTRACT

Natural beverage products and methods for making the same are disclosed. The natural beverage products comprise an acidulant comprising lactic acid and at least one of tartaric and citric acids, optionally other natural carboxylic acids and no phosphoric acid.

2 Claims, No Drawings

(56) References Cited

U.S. PATENT DOCUMENTS

| | | |
|---|---|---|
| 6,083,549 A | 7/2000 | Harada et al. |
| 6,132,787 A | 10/2000 | Bunger et al. |
| 6,136,356 A | 10/2000 | Bunger et al. |
| 6,180,155 B1 | 1/2001 | Lotz et al. |
| 6,255,557 B1 | 7/2001 | Brandle |
| 6,265,012 B1 | 7/2001 | Shamil |
| 6,361,812 B1 | 3/2002 | Ekanayake et al. |
| 6,375,992 B1 | 4/2002 | Blumenstein-Stahl et al. |
| 6,376,005 B2 | 4/2002 | Bunger et al. |
| 6,391,864 B1 | 5/2002 | Stone |
| 6,413,561 B1 | 7/2002 | Sass et al. |
| 6,416,806 B1 | 7/2002 | Zhou |
| 6,432,464 B1 | 8/2002 | Andersen et al. |
| 6,432,470 B2 | 8/2002 | Chaen et al. |
| 6,432,929 B1 | 8/2002 | Stone |
| 6,544,577 B1 | 4/2003 | Chu et al. |
| 6,558,723 B2 | 5/2003 | Ekanayake et al. |
| 6,589,555 B2 | 7/2003 | Pandya |
| 6,599,548 B2 | 7/2003 | Blyth et al. |
| 6,599,553 B2 | 7/2003 | Kealey et al. |
| 6,616,955 B2 | 9/2003 | Nunes et al. |
| 6,632,449 B2 | 10/2003 | Niehoff |
| 6,652,901 B2 | 11/2003 | Ishii |
| 6,682,766 B2 | 1/2004 | Blumenstein-Stahl et al. |
| 6,703,056 B2 | 3/2004 | Mehansho et al. |
| 6,706,295 B2 | 3/2004 | Mehansho et al. |
| 6,749,879 B2 | 6/2004 | Broz |
| 6,749,881 B2 | 6/2004 | Kataoka et al. |
| 6,759,067 B1 | 7/2004 | Ogasawara et al. |
| 6,759,073 B2 | 7/2004 | Heisey et al. |
| 6,780,443 B1 | 8/2004 | Nakatsu et al. |
| 6,783,789 B2 | 8/2004 | Mutilangi et al. |
| 6,794,375 B2 | 9/2004 | Sarama et al. |
| 6,821,545 B2 | 11/2004 | Bernhardt et al. |
| 6,838,106 B2 | 1/2005 | Kumamoto et al. |
| 6,838,107 B1 | 1/2005 | Bakal et al. |
| 6,838,109 B2 | 1/2005 | Nunes et al. |
| 6,890,567 B2 | 5/2005 | Nakatsu et al. |
| 6,899,901 B2 | 5/2005 | Nakatsu et al. |
| 6,984,376 B2 | 1/2006 | Stephenson et al. |
| 6,986,906 B2 | 1/2006 | Selzer et al. |
| 7,029,717 B1 | 4/2006 | Ojima et al. |
| 7,033,629 B2 | 4/2006 | Koss et al. |
| 7,052,725 B2 | 5/2006 | Chang et al. |
| 7,056,548 B2 | 6/2006 | Ogura et al. |
| 7,090,883 B2 | 8/2006 | Phipps |
| 7,105,190 B2 | 9/2006 | Ekanayake et al. |
| 7,781,005 B2 | 8/2010 | Mori |
| 2002/0004092 A1 | 1/2002 | Riha, III et al. |
| 2002/0122847 A1 | 9/2002 | Nunes et al. |
| 2002/0132037 A1 | 9/2002 | Zhou |
| 2002/0160090 A1 | 10/2002 | Lee et al. |
| 2002/0197371 A1 | 12/2002 | Lee et al. |
| 2003/0003212 A1 | 1/2003 | Chien et al. |
| 2003/0026872 A1 | 2/2003 | Dake et al. |
| 2003/0035875 A1 | 2/2003 | Dulebohn et al. |
| 2003/0059511 A1 | 3/2003 | Ishii |
| 2003/0064143 A1 | 4/2003 | Gerrish et al. |
| 2003/0096047 A1 | 5/2003 | Riha, III et al. |
| 2003/0165603 A1 | 9/2003 | Burklow et al. |
| 2003/0190396 A1 | 10/2003 | Merkel et al. |
| 2003/0211214 A1 | 11/2003 | Riha, III et al. |
| 2003/0224095 A2 | 12/2003 | DuBois et al. |
| 2003/0236399 A1 | 12/2003 | Zheng et al. |
| 2004/0022914 A1 | 2/2004 | Allen |
| 2004/0076728 A2 | 4/2004 | Merkel et al. |
| 2004/0115329 A1 | 6/2004 | Tamiya et al. |
| 2004/0151771 A1 | 8/2004 | Gin et al. |
| 2004/0170735 A2 | 9/2004 | Merkel et al. |
| 2004/0197453 A1 | 10/2004 | Hirao et al. |
| 2004/0247669 A1 | 12/2004 | Gin et al. |
| 2005/0069616 A1 | 3/2005 | Lee et al. |
| 2005/0106305 A1 | 5/2005 | Abraham et al. |
| 2005/0136169 A1 | 6/2005 | Haung et al. |
| 2005/0152997 A1 | 7/2005 | Selzer et al. |
| 2005/0158444 A1 | 7/2005 | Koski |
| 2005/0208192 A1 | 9/2005 | Nakakura et al. |
| 2005/0220964 A1 | 10/2005 | Rizo et al. |
| 2005/0226983 A1 | 10/2005 | Bakal et al. |
| 2005/0260328 A1 | 11/2005 | Lutz et al. |
| 2006/0019019 A1 | 1/2006 | Rohaly et al. |
| 2006/0034873 A1 | 2/2006 | Radke et al. |
| 2006/0034897 A1 | 2/2006 | Boghani et al. |
| 2006/0068072 A9 | 3/2006 | Lee et al. |
| 2006/0068073 A1 | 3/2006 | Catani et al. |
| 2006/0073254 A1 | 4/2006 | Catani et al. |
| 2006/0083838 A1 | 4/2006 | Jackson et al. |
| 2006/0093720 A1 | 5/2006 | Tatz |
| 2006/0099309 A1 | 5/2006 | Mattson et al. |
| 2006/0099318 A1 | 5/2006 | Iwasaki et al. |
| 2006/0127450 A1 | 6/2006 | Chinen |
| 2006/0134291 A1 | 6/2006 | Rathjen |
| 2006/0134292 A1 | 6/2006 | Abelyan et al. |
| 2006/0134294 A1 | 6/2006 | McKee et al. |
| 2006/0142555 A1 | 6/2006 | Jonnala et al. |
| 2006/0159818 A1 | 7/2006 | Kunieda |
| 2006/0159820 A1 | 7/2006 | Rathjen et al. |
| 2006/0177559 A1 | 8/2006 | Gosselin et al. |
| 2006/0188548 A1* | 8/2006 | Mattson et al. ............ 424/439 |
| 2006/0204550 A1 | 9/2006 | Hassen |
| 2007/0026121 A1 | 2/2007 | Benedict et al. |
| 2007/0116800 A1 | 5/2007 | Prakask et al. |
| 2007/0116819 A1 | 5/2007 | Prakask et al. |
| 2007/0116820 A1 | 5/2007 | Prakash et al. |
| 2007/0116821 A1 | 5/2007 | Prakash et al. |
| 2007/0116822 A1 | 5/2007 | Prakash et al. |
| 2007/0116823 A1 | 5/2007 | Prakask et al. |
| 2007/0116824 A1 | 5/2007 | Prakask et al. |
| 2007/0116825 A1 | 5/2007 | Prakask et al. |
| 2007/0116826 A1 | 5/2007 | Prakask et al. |
| 2007/0116827 A1 | 5/2007 | Prakask et al. |
| 2007/0116828 A1 | 5/2007 | Prakask et al. |
| 2007/0116829 A1 | 5/2007 | Prakask et al. |
| 2007/0116830 A1 | 5/2007 | Prakask et al. |
| 2007/0116831 A1 | 5/2007 | Prakask et al. |
| 2007/0116832 A1 | 5/2007 | Prakask et al. |
| 2007/0116833 A1 | 5/2007 | Prakask et al. |
| 2007/0116834 A1 | 5/2007 | Prakask et al. |
| 2007/0116835 A1 | 5/2007 | Prakask et al. |
| 2007/0116836 A1 | 5/2007 | Prakask et al. |
| 2007/0116837 A1 | 5/2007 | Prakask et al. |
| 2007/0116838 A1 | 5/2007 | Prakask et al. |
| 2007/0116839 A1 | 5/2007 | Prakask et al. |
| 2007/0116840 A1 | 5/2007 | Prakask et al. |
| 2007/0116841 A1 | 5/2007 | Prakask et al. |
| 2007/0128311 A1 | 6/2007 | Prakask et al. |
| 2007/0134390 A1 | 6/2007 | Prakask et al. |
| 2007/0134391 A1 | 6/2007 | Prakask et al. |
| 2007/0224321 A1 | 9/2007 | Prakask et al. |
| 2007/0275147 A1 | 11/2007 | Prakask et al. |
| 2007/0292582 A1 | 12/2007 | Prakask et al. |
| 2008/0107775 A1 | 5/2008 | Prakask et al. |
| 2008/0107776 A1 | 5/2008 | Prakask et al. |
| 2008/0107787 A1 | 5/2008 | Prakask et al. |
| 2008/0108710 A1 | 5/2008 | Prakask et al. |
| 2008/0226770 A1 | 9/2008 | Lee et al. |
| 2008/0226773 A1 | 9/2008 | Lee et al. |
| 2008/0226776 A1 | 9/2008 | Roy et al. |
| 2008/0226787 A1 | 9/2008 | Johnson et al. |
| 2008/0226788 A1 | 9/2008 | Chang et al. |
| 2008/0226789 A1 | 9/2008 | Roy et al. |
| 2008/0226790 A1 | 9/2008 | Johnson et al. |
| 2008/0226793 A1 | 9/2008 | Chang et al. |
| 2008/0226794 A1 | 9/2008 | Bell et al. |
| 2008/0226795 A1 | 9/2008 | May et al. |
| 2008/0226796 A1 | 9/2008 | Lee et al. |
| 2008/0226798 A1 | 9/2008 | Talebi et al. |
| 2008/0226799 A1 | 9/2008 | Lee et al. |
| 2008/0226800 A1 | 9/2008 | Lee et al. |
| 2008/0226801 A1 | 9/2008 | May et al. |
| 2008/0226802 A1 | 9/2008 | Lee et al. |
| 2008/0226803 A1 | 9/2008 | Letourneau et al. |
| 2008/0226804 A1 | 9/2008 | Talebi et al. |
| 2008/0254185 A1 | 10/2008 | Yamakawa et al. |

(56) References Cited

U.S. PATENT DOCUMENTS

| | | |
|---|---|---|
| 2008/0292764 A1 | 11/2008 | Prakask et al. |
| 2008/0292775 A1 | 11/2008 | Prakask et al. |
| 2009/0053378 A1 | 2/2009 | Prakask et al. |
| 2009/0074935 A1 | 3/2009 | Lee et al. |
| 2009/0162484 A1 | 6/2009 | Bell et al. |
| 2009/0162487 A1 | 6/2009 | Bell et al. |
| 2009/0162488 A1 | 6/2009 | Bell et al. |
| 2010/0112138 A1 | 5/2010 | Roy et al. |
| 2012/0121734 A1 | 5/2012 | Inoue et al. |

FOREIGN PATENT DOCUMENTS

| | | |
|---|---|---|
| JP | 2000270804 | 10/2000 |
| JP | 2002034471 A | 2/2002 |
| JP | 2002514883 | 5/2002 |
| JP | 2004018756 A | 1/2004 |
| JP | 2005-087184 A | 4/2005 |
| JP | 2005261395 A | 9/2005 |
| JP | 2006174844 A | 7/2006 |
| JP | 2007503214 | 2/2007 |
| RU | 2041663 C1 | 8/1995 |
| RU | 2126037 C1 | 2/1999 |
| RU | 2147205 C1 | 1/2000 |
| RU | 2000127669 A | 3/2001 |
| RU | 2003114297 A | 11/2004 |
| RU | 2003134642 A | 1/2005 |
| WO | 99/34689 A1 | 7/1999 |
| WO | 0232236 A2 | 4/2002 |
| WO | 0234874 A1 | 5/2002 |
| WO | 02/087358 A1 | 11/2002 |
| WO | 02087350 A1 | 11/2002 |
| WO | WO 2005/112668 | 12/2005 |
| WO | WO 2006/072921 | 7/2006 |
| WO | 2006085785 A1 | 8/2006 |
| WO | WO 2006085785 A1 * | 8/2006 |
| WO | WO 2006/095366 | 9/2006 |
| WO | 2006127935 A | 11/2006 |
| WO | 2006127935 A1 | 11/2006 |
| WO | WO 2006/127935 | 11/2006 |
| WO | 2007078293 A | 7/2007 |
| WO | 2007078293 A1 | 7/2007 |

OTHER PUBLICATIONS

Shultz, "Caramel Color," Dec. 2006, retrieved from the Internet: http://www.foodproductdesign.com.*
European Commission Scientific Committee of Food (Jun. 1999). Opinion on Stevioside as a Sweetener http://www.food.gov.uk/multimedia/pdfs/stevioside.pdf.
http://www.inchem.org/documents/jecfa/jecmono/v042je07.htm—International Programme on Chemical Safety World Health Organization, Safety Evaluation of Certain Food Additives, Who Food Additives Series: 42, Prepared by the Fifty-first meeting of the Joint FAO/WHO Expert Committee on Food Additives (JECFA), World Health Organization, Geneva, 1999, IPCS—International Programme on Chemical Safety, STEVIOSIDE, First draft prepared by Dr. Josef Schlatter, Swiss Federal Office of Public Health, Switzerland.
International Search Report for corresponding PCT/US2008/056810.
Office Action relating to corresponding EP Application No. 08732102.2.
Offical Action from corresponding Russian Patent Application No. 2008151090, with English translation.
Russian publication identified as, "POMOSOVA".
Russian publication identified as "Sarashvili", (1999/2000).
RU Office Action 2008151086 relating to instance application.
Redacted version of RU Office Action 2008151086.
Lourdes Morales, M., et al., "Simultaneous Determination of Organic Acids and Sweeteners in Soft Drinks by ION-Exclusion HPLC," J. Sep.Sci., 2001, No. 24, p. 879-884 (3).
Van Mourik, S.V., "Innovation of Products of PLC ASAPAVIT-eng," Nov. 5, 2003p. 34-35.
Redacted English Translation of Office Action relating to corresponding AR application No. P080101069.
Examiner Report relating to corresponding CA 2,656,100.
Office Action relating to corresponding AR Application No. P08 01 01069.
Redacted English Translation of Office Action relating to corresponding AR Application No. P08 01 01069.
Office Action relating to corresponding JP Application No. 2009-553771.
English Translation of Office Action relating to corresponding JP Application No. 2009-553771.
English Abstract of WO 1994/008473 relating to JP 8502648.
English Abstract of WO 2005/020721 relating to JP 2007503214.
English Abstract of WO 1993/013677 relating to JP 2002514883.
English Abstract of JP 62091162.
English Abstract of JP 2004018756.
Extended European Search Report relating to corresponding EP Application No. 12000251.4, dated Mar. 7, 2012.
Database WPI, Week 198448, Oct. 18, 1984.
English Abstract of JP 60188035.
English Abstract of JP 2000270804.
Second Examination Report relating to corresponding IN Application No. 2742/MUMNP/2008.
Office Action relating to corresponding CA Application No. 2,656,100.
Office Action relating to corresponding MX Application No. MX/a/2009/009726.
English Translation of Office Action relating to corresponding MX Application No. MX/a/2009/009726.
Office Action relating to corresponding JP Application No. 2009-553771, dated May 15, 2012.
English Translation of Office Action relating to corresponding JP Application No. 2009-553771, dated May 15, 2012.
English Abstract of JP 9194370.
English Abstract of JP 2002034471.
English Abstract of JP 2005261395.
English Abstract of JP 2006174844.
Office Action relating to corresponding CN Application No. 200880008298.3, dated Sep. 26, 2012.
English Translation of Office Action relating to corresponding CN Application No. 200880008298.3, dated Sep. 26, 2012.
Office Action relating to corresponding CN Application No. 200880008298.3, dated Oct. 10, 2012.
English Translation of Office Action relating to corresponding CN Application No. 200880008298.3, Issued on Oct. 10, 2012.
Morales, M. L., et al., "Simultaneous determination of organic acids and sweeteners in soft drinks by ion-exclusion HPLC," Dec. 31, 2001, pp. 879-884, vol. 24, Journal of Seperation Science.
Office Action relating to corresponding EP Application No. 11010134.2, dated Jan. 30, 2013.
Office Action relating to corresponding JP Application No. 2009-553771, dated Apr. 30, 2013.
English Translation of Office Action relating to corresponding JP Application No. 2009-553771, issued on Apr. 30, 2013.
International Search Report relating to corresponding PCT/US2008/056810.
Office Action relating to corresponding RU 2008151088.
Redacted English translation of Office Action relating to corresponding RU 2008151088.
English Abstract of RU 2003114297.
English Abstract of RU 2147205.
English Abstract of JP 2273163, Reimotondo et al., Nov. 1990.
English Abstract of JP 2002060382, Takesi et al., Feb. 2002.
English Abstract of CN 1410003, Wang, Apr. 2003.
Office Action relating to corresponding IN Application No. 2742/MUMNP/2008.

* cited by examiner

NATURAL BEVERAGE PRODUCTS

FIELD OF THE INVENTION

This invention relates to beverages and other beverage products, such as beverage concentrates, etc. In particular, this invention relates to beverages and other beverage products having formulations suitable to meet market demand for natural ingredients and alternative nutritional characteristics or flavor profiles in beverages.

BACKGROUND

It has long been known to produce beverages of various formulations. Improved and new formulations are desirable to meet changing market demands. In particular, there is perceived market demand for beverages having alternative nutritional characteristics, including, for example, reduced calorie content. Also, there is perceived market demand for beverages having alternative flavor profiles, including good taste, mouthfeel, etc. In addition, there is consumer interest in beverages and other beverage products, such as beverage concentrates, etc. Whose formulations make greater use of natural ingredients, that is, ingredients distilled, extracted, concentrated or similarly obtained from harvested plants and other naturally occurring sources, with limited or no further processing.

The development of new beverage formulations, for example, new beverage formulations employing alternative sweeteners, flavorants, flavor enhancing agents and the like, presents challenges in addressing associated bitterness and/or other off-tastes. In addition, such challenges typically are presented in new beverage formulations developed for alternative nutritional characteristics and/or flavor profiles. There is need for new beverage formulations which can satisfactorily meet the combination of objectives including nutritional, flavor, shelf life, and other objectives.

Development of new beverage formulations has faced obstacles. For example, U.S. Pat. No. 4,956,191 suggests that carbonated beverages which contain blends of saccharin or the stevia extract with aspartame tend to be less organoleptically pleasing than those containing sugar.

It is therefore an object of the present invention to provide beverages and other beverage products. It is an object of at least certain embodiments of the invention (that is, not necessarily all embodiments of the invention) to provide beverages and other beverage products having desirable taste properties. It is an object of at least certain (but not necessarily all) embodiments of the invention to provide beverages and other beverage products having improved formulations, such as all natural ingredients. These and other objects, features and advantages of the invention or of certain embodiments of the invention will be apparent to those skilled in the art from the following disclosure and description of exemplary embodiments.

BRIEF SUMMARY OF THE INVENTION

In accordance with a first aspect, a natural beverage product, such as a natural beverage, a natural beverage concentrate, or other product is provided which comprises an acidulant comprising lactic acid and at least one of tartaric and citric acids, optionally other natural carboxylic acids, and no phosphoric acid.

In accordance with another aspect, a method of preparing a natural beverage product is provided which comprises including in the beverage product an acidulant comprising lactic, acid and at least one of tartaric and citric acids, optionally other natural carboxylic acids.

In accordance with another aspect, a clear cola beverage product is provided, comprising water, at least one sweetener, an acidulant comprising lactic acid and at least one of tartaric and citric acids, and cola flavor.

In accordance with another aspect, a clear natural beverage is provided comprising an acidulant comprising lactic acid and at least one of tartaric and citric acids, and no phosphoric acid. As used here, substantially clear means that the beverages have substantially no turbidity and substantially no color.

It will be appreciated by those skilled in the art, given the benefit of the following description of certain exemplary embodiments of the beverage and other beverage products disclosed here, that at least certain embodiments of the invention have improved or alternative formulations suitable to provide desirable taste profiles, nutritional characteristics, etc. These and other aspects, features and advantages of the invention or of certain embodiments of the invention will be further understood by those skilled in the art from the following description of exemplary embodiments.

DETAILED DESCRIPTION OF CERTAIN EXEMPLARY EMBODIMENTS

It should be understood that beverages and other beverage products in accordance with this disclosure may have any of numerous different specific formulations or constitutions. The formulation of a beverage product in accordance with this disclosure can vary to a certain extent, depending upon such factors as the product's intended market segment, its desired nutritional characteristics, flavor profile and the like. For example, it will generally be an option to add further ingredients to the formulation of a particular beverage embodiment, including any of the beverage formulations described below. Additional (i.e., more and/or other) sweeteners may be added, flavorings, electrolytes, vitamins, fruit juices or other fruit products, tastents, masking agents and the like, flavor enhancers, and/or carbonation typically can be added to any such formulations to vary the taste, mouthfeel, nutritional characteristics, etc. In general, a beverage in accordance with this disclosure typically comprises at least water, sweetener, acidulant and flavoring. Exemplary flavorings which may be suitable for at least certain formulations in accordance with this disclosure include cola flavoring, citrus flavoring, spice flavorings and others. Carbonation in the form of carbon dioxide may be added for effervescence. Natural preservatives can be added if desired, depending upon the other ingredients, production technique, desired shelf life, etc. Optionally, natural caffeine can be added. Certain exemplary embodiments of the beverages disclosed here are cola-flavored carbonated beverages, characteristically containing carbonated water, sweetener, kola nut extract and/or other cola flavoring, caramel coloring, and optionally other ingredients. Additional and alternative suitable ingredients will be recognized by those skilled in the art given the benefit of this disclosure.

The beverage products disclosed here include beverages, i.e., ready to drink liquid formulations, beverage concentrates and the like. Beverages include, e.g., carbonated and non-carbonated soft drinks, fountain beverages, frozen ready-to-drink beverages, coffee beverages, tea beverages, dairy beverages, powdered soft drinks, as well as liquid concentrates, flavored waters, enhanced waters, fruit juice and fruit juice-flavored drinks, sport drinks, and alcoholic products. The terms "beverage concentrate" and "syrup" are used interchangeably throughout this disclosure. At least certain exemplary embodiments of the beverage concentrates contemplated are prepared with an initial volume of water to which the additional ingredients are added. Full strength beverage compositions can be formed from the beverage concentrate by adding further volumes of water to the concentrate. Typically, for example, full strength beverages can be prepared from the concentrates by combining approximately 1 part concentrate with between approximately 3 to approximately 7 parts water. In certain exemplary embodiments the full strength beverage is prepared by combining 1 part concentrate with 5 parts water. In certain exemplary embodiments the additional water used to form the full strength beverages is carbonated water. In certain other embodiments, a full strength beverage is directly prepared without the formation of a concentrate and subsequent dilution.

Water is a basic ingredient in the beverages disclosed here, typically being the vehicle or primary liquid portion in which the remaining ingredients are dissolved, emulsified, suspended or dispersed. Purified water can be used in the manufacture of certain embodiments of the beverages disclosed here, and water of a standard beverage quality can be employed in order not to adversely affect beverage taste, odor, or appearance. The water typically will be clear, colorless, free from objectionable minerals, tastes and odors, free from organic matter, low in alkalinity and of acceptable microbiological quality based on industry and government standards applicable at the time of producing the beverage. In certain typical embodiments, water is present at a level of from about 80% to about 99.9% by weight of the beverage. In at least certain exemplary embodiments the water used in beverages and concentrates disclosed here is "treated water," which refers to water that has been treated to reduce the total dissolved solids of the water prior to optional supplementation, e.g., with calcium as disclosed in U.S. Pat. No. 7,052,725. Methods of producing treated water are known to those of ordinary skill in the art and include deionization, distillation, filtration and reverse osmosis ("r-o"), among others. The terms "treated water," "purified water,", "demineralized water," "distilled water," and "r-o water" are understood to be generally synonymous in this discussion, referring to water from which substantially all mineral content has been removed, typically containing no more than about 500 ppm total dissolved solids, e.g. 250 ppm total dissolved solids.

Those of ordinary skill in the art will understand that, for convenience, some ingredients are described here in certain cases by reference to the original form of the ingredient in which it is added to the beverage product formulation. Such original form may differ from the form in which the ingredient is found in the finished beverage product. Thus, for example, in certain exemplary embodiments of the natural cola beverage products according to this disclosure, sucrose and liquid sucrose would typically be substantially homogenously dissolved and dispersed in the beverage. Likewise, other ingredients identified as a solid, concentrate (e.g., juice concentrate), etc. Would typically be homogenously dispersed throughout the beverage or throughout the beverage concentrate, rather than remaining in their original form. Thus, reference to the form of an ingredient of a beverage product formulation should not be taken as a limitation on the form of the ingredient in the beverage product, but rather as a convenient means of describing the ingredient as an isolated component of the product formulation.

Various sweeteners are included in the formulations of the beverages disclosed here. The sweeteners are edible consumables suitable for consumption and for use in beverages. By "edible consumables" is meant a food or beverage or an ingredient of a food or beverage for human or animal consumption. The sweetener or sweetening agent used here and in the claims can be nutritive or non-nutritive, depending on the particular embodiments, and preferably natural beverage ingredient or additive (or mixtures of them) which provides sweetness to the beverage, i.e., which is perceived as sweet by the sense of taste. The perception of flavoring agents and sweetening agents may depend to some extent on the interrelation of elements. Flavor and sweetness may also be perceived separately, i.e., flavor and sweetness perception may be both dependent upon each other and independent of each other. For example, when a large amount of a flavoring agent is used, a small amount of a sweetening agent may be readily perceptible and vice versa. Thus, the oral and olfactory interaction between a flavoring agent and a sweetening agent may involves the interrelationship of elements.

As used herein, "taste" refers to a combination of sweetness perception, temporal effects of sweetness perception, i.e., on-set and duration, off-tastes, e.g. Bitterness and metallic taste, residual perception (aftertaste) and tactile perception, e.g. Body and thickness. As used herein, a "full-calorie" beverage formulation is one fully sweetened with a nutritive sweetener. The term "nutritive sweetener" refers generally to sweeteners which provide significant caloric content in typical usage amounts, e.g., more than about 5 calories per 8 oz. Serving of beverage. As used herein, a "potent sweetener" means a sweetener which is at least twice as sweet as sugar, that is, a sweetener which on a weight basis requires no more than half the weight of sugar to achieve an equivalent sweetness. For example, a potent sweetener may require less than one-half the weight of sugar to achieve an equivalent sweetness in a beverage sweetened to a level of 10 degrees brix with sugar. Potent sweeteners include both nutritive and non-nutritive sweeteners. In addition, potent sweeteners include both natural potent sweeteners and artificial potent sweeteners. However, for natural beverage products disclosed here, only natural potent sweeteners are employed. Commonly accepted potency figures for certain potent sweeteners include, for example,

| | |
|---|---|
| Cyclamate | 30 times as sweet as sugar |
| Stevioside | 100-250 times as sweet as sugar |
| Mogroside v | 100-300 times as sweet as sugar |
| Rebaudioside a | 150-300 times as sweet as sugar |
| Acesulfame-k | 200 times as sweet as sugar |
| Aspartame | 200 times as sweet as sugar |
| Saccharine | 300 times as sweet as sugar |
| neohesperidin dihydrochalcone | 300 times as sweet as sugar |
| Sucralose | 600 times as sweet as sugar |
| Neotame | 8,000 times as sweet as sugar |

As used herein, a "non-nutritive sweetener" is one which does not provide significant caloric content in typical usage amounts, i.e., is one which imparts less than 5 calories per 8 oz. Serving of beverage to achieve the sweetness equivalent of 10 degrees Brix of sugar. As used herein, "reduced calorie beverage" means a beverage having at least a 25% reduction in calories per 8 oz. Serving of beverage as compared to the full calorie version, typically a previously commercialized full-calorie version. As used herein, a "low-calorie beverage" has fewer than 40 calories per 8 oz. Serving of beverage. As used herein, "zero-calorie" or "diet" means having less than 5 calories per serving, e.g., per 8 oz. For beverages.

Natural cola embodiments of the beverage products disclosed here are natural in the that they do not contain anything artificial or synthetic (including any color additives regardless of source) that would not normally be expected to be in the food. As used herein, therefore, a "natural" beverage composition is defined in accordance with the following guidelines: raw materials for a natural ingredient exists or originates in nature. Biological synthesis involving fermentation and enzymes can be employed, but synthesis with chemical reagents is not utilized. Artificial colors, preservatives, and flavors are not considered natural ingredients. Ingredients may be processed or purified through certain specified techniques including at least: physical processes, fermentation, and enzymolysis. Appropriate processes and purification techniques include at least: absorption, adsorption, agglomeration, centrifugation, chopping, cooking (baking, frying, boiling, roasting), cooling, cutting, chromatography, coating, crystallization, digestion, drying (spray, freeze drying, vacuum), evaporation, distillation, electrophoresis, emulsification, encapsulation, extraction, extrusion, filtration, fermentation, grinding, infusion, maceration, microbiological (rennet, enzymes), mixing, peeling, percolation, refrigeration/freezing, squeezing, steeping, washing, heating, mixing, ion exchange, lyophilization, osmose, precipitation, salting out, sublimation, ultrasonic treatment, concentration, flocculation, homogenization, reconstitution, enzymolysis (using enzymes found in nature). Processing aids (currently defined as substances used as manufacturing aids to enhance the appeal or utility of a food component, including clarifying agents, catalysts, flocculants, filter aids, and crystallization inhibitors, etc. See 21 cfr §170.3(o)(24)) are considered incidental additives and may be used if removed appropriately.

Sweeteners suitable for use in various embodiments of the beverage products disclosed here are preferably natural sweeteners. Suitable sweeteners and combinations of sweeteners are selected for the desired nutritional characteristics, taste profile, beverage mouthfeel and other organoleptic factors. Natural sweeteners suitable for at least certain exemplary embodiments include, for example, sucrose, liquid sucrose, fructose, liquid fructose, glucose, liquid glucose, honey, glucose-fructose syrup from natural sources such as apple, chicory, honey, etc., e.g., high fructose corn syrup, invert sugar, sorbitol, mannitol, xylitol, glycyrrhizin, d-tagatose, erythritol, meso-erythritol, malitol, maltose, lactose, fructo-oligosaccharides, Lo Han Guo extracts, Lo Han Guo juice concentrate, Lo Han Guo powder of mogroside v content from 2 to 99%, rebaudioside a, stevioside, other steviol glycosides, stevia rebaudiana extracts, xylose, arabinose, isomalt, lactitol, maltitol, trehalose, rhamnose, and ribose, and protein sweeteners such as monatin, thaumatin, monellin, brazzein, 1-alanine and glycine. As further discussed below, exemplary natural nutritive sweeteners suitable for some or all embodiments of the beverages disclosed here, specifically, full calorie or reduced calorie beverage products include, for example, crystalline or liquid sucrose, fructose, glucose, glucose-fructose syrup from natural sources such as apple, chicory, honey, etc., e.g., high fructose corn syrup, invert sugar and the like and mixtures of any of them. Exemplary natural, non-nutritive, high potency sweeteners suitable for some or all diet or reduced calorie embodiments of the beverages disclosed here include rebaudioside a, stevioside, other steviol glycosides, stevia rebaudiana extracts, Lo Han Guo juice concentrate, Lo Han Guo powder of mogroside v content from 2 to 99% monatin, thaumatin, monellin, brazzein, and mixtures of any of them. Also, in at least certain exemplary embodiments of the beverages disclosed here, combinations of one or more natural nutritive sweeteners and/or one or more natural non-nutritive sweeteners are used to provide the sweetness and other aspects of desired taste profile and nutritive characteristics. It should also be recognized that certain such sweeteners will, either in addition or instead, act as tastents, masking agents or the like in various embodiments of the beverages disclosed here, e.g., when used in amounts below its (or their) sweetness perception threshold in the beverage in question.

In at least certain exemplary embodiments of the beverages disclosed here, the sweetener component can include nutritive, natural crystalline or liquid sweeteners such as sucrose, liquid sucrose, fructose, liquid fructose, glucose, liquid glucose, glucose-fructose syrup from natural sources such as apple, chicory, honey, etc., e.g., high fructose corn syrup, invert sugar, maple syrup, maple sugar, honey, brown sugar molasses, e.g., cane molasses, such as first molasses, second molasses, blackstrap molasses, and sugar beet molasses, sorghum syrup, Lo Han Guo juice concentrate, and/or others. Such sweeteners are present in at least certain exemplary embodiments in an amount of from about 0.1% to about 20% by weight of the beverage, such as from about 6% to about 16% by weight, depending upon the desired level of sweetness for the beverage. To achieve desired beverage uniformity, texture and taste, in certain exemplary embodiments of the natural beverage products disclosed here, standardized liquid sugars as are commonly employed in the beverage industry can be used. Typically such standardized sweeteners are free of traces of nonsugar solids which could adversely affect the flavor, color or consistency of the beverage.

Natural non-nutritive high potency sweeteners are suitable for use in at least certain exemplary embodiments of the beverages disclosed here. The natural non-nutritive high potentency sweeteners include, for example, Lo Han Guo powder of mogroside v content from 2 to 99%, and rebaudioside a, stevioside, other steviol glycosides, stevia rebaudiana extracts, as discussed further below. Optionally, the sweetener component can include natural low potency sweeteners, for example, erythritol, tagatose, or a mixture of the two. Non-nutritive, high potency sweeteners typically are employed at a level of milligrams per fluid ounce of beverage, according to their sweetening power, any applicable regulatory provisions of the country where the beverage is to be marketed, the desired level of sweetness of the beverage, etc. It will be within the ability of those skilled in the art, given the benefit of this disclosure, to select suitable additional or alternative sweeteners for use in various embodiments of the beverage products disclosed here.

As mentioned above, at least certain exemplary embodiments of the beverages disclosed here employ steviol glycosides, e.g., steviosides and rebaudiosides and related compounds for sweetening. These sweeteners can be obtained, for example, by extraction or the like from the stevia plant. Stevia (e.g., stevia rebaudiana bectoni) is a sweet-tasting plant. The leaves contain a complex mixture of natural sweet diterpene glycosides. Steviol glycosides, e.g., steviosides and rebaudiosides are components of stevia that contribute sweetness. Typically, these compounds are found to include stevioside (4-13% dry weight), steviolbioside (trace), the rebaudiosides, including rebaudioside a (2-4%), rebaudioside b (trace), rebaudioside c (1-2%), rebaudioside d (trace), and rebaudioside e (trace), and dulcoside a (0.4-0.7%). The following nonsweet constituents also have been identified in the leaves of stevia plants: labdane, diterpene, triterpenes, sterols, flavonoids, volatile oil constituents, pigments, gums and inorganic matter.

The sweetener Lo Han Guo, which has various different spellings and pronunciations and is abbreviated here in some instances as lhg, can be obtained from fruit of the plant family cucurbitaceae, tribe jollifieae, subtribe thladianthinae, genus siraitia. Lhg often is obtained from the genus/species *s. Grosvenorii, s. Siamensis, s. Silomaradjae, s. Sikkimensis, s. Africana, s. Bomeensis, and s. Taiwaniana*. Suitable fruit includes that of the genus/species *s. Grosvenorii*, which is often called Lo Han Guo. Lo Han Guo is a potent sweetener which can be provided as a natural nutritive or natural non-nutritive sweetener. For example, Lo Han Guo juice concentrate may be a nutritive sweetener, and Lo Han Guo powder may be a non-nutritive sweetener. LHG contains triterpene glycosides or mogrosides, preferably mogroside v, mogroside iv, (11-oxo-mogroside v), siamenoside and mixtures thereof, which constituents may be used as lhg sweeteners. Lo han guo juice concentrate, Lo Han Guo powder of mogroside v content from 2 to 99%, lhg juice concentrate can be produced, for example, as discussed in U.S. Pat. No. 5,411,755. Sweeteners from other fruits, vegetables or plants also may be used as natural or processed sweeteners or sweetness enhancers in at least certain exemplary embodiments of the beverages disclosed here.

Acid used in the natural beverages disclosed here can serve any one or more of several functions, including, for example, lending tartness to the taste of the beverage, enhancing palatability, increasing thirst quenching effect, modifying sweetness and acting as a mild preservative. Suitable acids are known and will be apparent to those skilled in the art given the benefit of this disclosure. Phosphoric acid, an artificial compound, is commonly included in cola and other beverage formulations. Replacing phosphoric acid with a natural acid has been a challenge. We have now discovered that by replacing phosphoric acid with an acidulant comprising at least one natural carboxylic acid, the bitter and tart aftertaste associated with beverages sweetened with natural high potency sweetener(s) is greatly reduced. Exemplary acids found to be suitable for use in some or all embodiments of the natural beverage products disclosed here include citric, tartaric, lactic acids, optionally other natural carboxylic acids, and mixtures of any of them. Preferably, the acidulant comprises lactic acid and at least one of tartaric and citric acids. Preferably, the acidulant comprises a mixture of lactic, tartaric, and citric acids. The acid can be used in solution form, for example, and in an amount sufficient to provide the desired pH of the beverage. Typically, for example, the one or more acids of the acidulant are used in amount, collectively, of from about 0.01% to about 1.0% by weight of the beverage, e.g., from about 0.05% to about 0.5% by weight of the beverage, such as 0.1% to 0.25% by weight of the beverage, depending upon the acidulant used, desired pH, other ingredients used, etc. The pH of at least certain exemplary embodiments of the beverages disclosed here can be a value within the range of from about 2.0 to about 5.0. The acid in certain exemplary embodiments enhances beverage flavor. Too much acid can impair the beverage flavor and result in sourness or other off-taste, while too little acid can make the beverage taste flat.

The particular acid or acids chosen and the amount used will depend, in part, on the other ingredients, the desired shelf life of the beverage product, as well as effects on the beverage pH, titratable acidity, and taste. In the formation of calcium-supplemented beverages, the presence of calcium salts increases the pH which requires additional acids to both assist the dissolution of the salt and maintain a desirable pH for stability. The presence of the additional acid in the beverage composition, which increases the titratable acidity of the composition, will result in a more tart or sour taste to the resulting beverage. It will be within the ability of those skilled in the art, given the benefit of this disclosure, to select a suitable acid or combination of acids and the amounts of such acids for the acidulant component of any particular embodiment of the beverage products disclosed here.

Cola beverages typically exhibit a dark brown color derived from caramel coloring. Caramel is the dark brown material resulting from carefully controlled heat treatment of food grade carbohydrates, and therefore is known as "burnt sugar color." There are four classes of caramel, classified by the inclusion of or processing with additional reactants. Caramel class i is plain caramel with no added reactants, so it is natural. In order to darken the color of caramel, artificial reactants such as caustic sulfite and/or ammonia can be added. Caramel class ii is caramel that has been processed with caustic sulfite. Caramel class iii is caramel that has been processed with ammonia. Caramel class iv is caramel that has been processed with both caustic sulfite and ammonia, and is currently used in the beverage industry to impart a dark brown color to cola beverages. Of the four classes of caramel, currently only caramel class I can be used as a colorant in natural cola beverages, but for at least certain exemplary embodiments of the natural cola beverages disclosed here, caramel class I by itself impart a color which may be found insufficiently dark brown to meet the desired cola appearance. A natural colorant comprising caramel class I and concentrated apple extract has been found to provide sufficiently dark brown color to impart a satisfactory cola appearance. Thus, colorant suitable for certain embodiments of the cola beverages disclosed here comprises caramel class I and concentrated apple extract. In certain exemplary embodiments, the concentrated apple extract comprises coloring compounds and sugar extracted from apples. Preferably, such concentrated apple extract comprises a dark brown viscous liquid having a minimum color index of about 1.2 (420 nm, d=10 mm, 0.4%), a pH of about 4 to about 6, and a brix value of about 65 to about 72. In at least certain exemplary embodiments, the weight ratio of caramel class I to concentrated apple extract is from about 1:3 to about 1:5, and preferably is about 1:3.8. In at least certain exemplary embodiments, the total concentration of colorant is from about 5.0 to about 10.0 g/l of the beverage, and preferably is about 6.5 g/l of the beverage. It will be within the ability of those skilled in the art, given the benefit of this disclosure, to select suitable additional or alternative colorants for use in various embodiments of the beverage products disclosed here.

Certain exemplary embodiments of the beverage products disclosed here also may contain small amounts of buffering agents to adjust pH. Such agents include, e.g., the potassium, sodium, or calcium salts of citric, malic, tartaric, lactic, ascorbic, cinnamic, glutaric, fumaric, gluconic, succinic, maleic and adipic acids, and mixtures of any of them, if natural. The amount included will depend, of course, on the type of buffering agents and on the degree to which the pH is to be adjusted.

The beverage products disclosed here optionally contain additional ingredients, including, for example, flavorings such as natural fruit flavors, botanical flavors, other flavors, and mixtures thereof. As used here, the term "fruit flavor" refers generally to those flavors derived from the edible reproductive part of a seed plant. Included are both those wherein a sweet pulp is associated with the seed, e.g., banana, tomato, cranberry and the like, and those having a small, fleshy berry. The term berry also is used here to include aggregate fruits, i.e., not "true" berries, but fruit commonly accepted as such. Examples of suitable fruit or berry sources include whole berries or portions thereof, berry juice, berry juice concentrates, berry purees and blends thereof, dried berry powders, dried berry juice powders, and the like.

Exemplary fruit flavors include the citrus flavors, e.g., orange, lemon, lime, tangerine, mandarin orange, tangelo, pomelo, and grapefruit, and such flavors as apple, grape, cherry, and pineapple flavors and the like, and mixtures thereof. In certain exemplary embodiments the beverage concentrates and beverages comprise a fruit flavor component, e.g., a juice concentrate or juice. As used here, the term "botanical flavor" refers to flavors derived from parts of a plant other than the fruit. As such, botanical flavors can include those flavors derived from essential oils and extracts of nuts, bark, roots and leaves. Examples of such flavors include cola flavors, tea flavors, coffee flavors and the like, and mixtures thereof. The flavor component can further comprise a blend of various of the above-mentioned flavors. In certain exemplary embodiments of the beverage concentrates and beverages a cola flavor component is used or a tea flavor component. The particular amount of the flavor component useful for imparting flavor characteristics to the beverages of the present invention will depend upon the flavor(s) selected, the flavor impression desired, and the form of the flavor component. Those skilled in the art, given the benefit of this disclosure, will be readily able to determine the amount of any particular flavor component(s) used to achieve the desired flavor impression.

Juices suitable for use in at least certain exemplary embodiments of the beverage products disclosed here include, e.g., fruit, vegetable and berry juices. Juices can be employed in the present invention in the form of a concentrate, puree, single-strength juice, or other suitable forms. The term "juice" as used here includes single-strength fruit, berry, or vegetable juice, as well as concentrates, purees, milks, and other forms. Multiple different fruit, vegetable and/or berry juices can be combined, optionally along with other flavorings, to generate a beverage having the desired flavor. Examples of suitable juice sources include plum, prune, date, currant, fig, grape, raisin, cranberry, pineapple, peach, banana, apple, pear, guava, apricot, saskatoon berry, blueberry, plains berry, prairie berry, mulberry, elderberry, barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, sloe, rowan, gooseberry, pomegranate, persimmon, mango, rhubarb, papaya, litchi, lemon, orange, lime, tangerine, mandarin orange, tangelo, pomelo, and grapefruit etc. Numerous additional and alternative juices suitable for use in at least certain exemplary embodiments will be apparent to those skilled in the art given the benefit of this disclosure. In the beverages of the present invention employing juice, juice may be used, for example, at a level of at least about 0.2% by weight of the beverage. In certain exemplary embodiments juice is employed at a level of from about 0.2% to about 40% by weight of the beverage. Typically, juice can be used, if at all, in an amount of from about 1% to about 20% by weight.

Certain such juices which are lighter in color can be included in the formulation of certain exemplary embodiments to adjust the flavor and/or increase the juice content of the beverage without darkening the beverage color. Examples of such juices include apple, pear, pineapple, peach, lemon, lime, orange, apricot, grapefruit, tangerine, rhubarb, cassis, quince, passion fruit, papaya, mango, guava, litchi, kiwi, mandarin, coconut, and banana. Deflavored and decolored juices can be employed if desired.

Other flavorings suitable for use in at least certain exemplary embodiments of the beverage products disclosed here include, e.g., spice flavorings, such as cassia, clove, cinnamon, pepper, ginger, vanilla spice flavorings, cardamom, coriander, root beer, sassafras, ginseng, and others. Numerous additional and alternative flavorings suitable for use in at least certain exemplary embodiments will be apparent to those skilled in the art given the benefit of this disclosure. Flavorings can be in the form of an extract, oleoresin, juice concentrate, bottler's base, or other forms known in the art. In at least certain exemplary embodiments, such spice or other flavors complement that of a juice or juice combination.

The one or more flavorings can be used in the form of an emulsion. A flavoring emulsion can be prepared by mixing some or all of the flavorings together, optionally together with other ingredients of the beverage, and an emulsifying agent. The emulsifying agent may be added with or after the flavorings mixed together. In certain exemplary embodiments the emulsifying agent is water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of beverage formulations, given the benefit of this disclosure. The emulsifier in exemplary embodiments comprises greater than about 3% of the mixture of flavorings and emulsifier. In certain exemplary embodiments the emulsifier is from about 5% to about 30% of the mixture.

Carbon dioxide is used to provide effervescence to certain exemplary embodiments of the beverages disclosed here. Any of the techniques and carbonating equipment known in the art for carbonating beverages can be employed. Carbon dioxide can enhance the beverage taste and appearance and can aid in safeguarding the beverage purity by inhibiting and destroying objectionable bacteria. In certain embodiments, for example, the beverage has a $co_2$ level up to about 6.0, e.g. about 4.7 volumes carbon dioxide. Typical embodiments may have, for example, from about 0.5 to 5.0, e.g. 4.0 volumes of carbon dioxide. As used here and independent claims, one volume of carbon dioxide is defined as the amount of carbon dioxide absorbed by any given quantity of water at 60° F. (16° C.) and atmospheric pressure. A volume of gas occupies the same space as does the water by which it is absorbed. The carbon dioxide content can be selected by those skilled in the art based on the desired level of effervescence and the impact of the carbon dioxide on the taste or mouthfeel of the beverage. The carbonation can be natural or synthetic.

Optionally, caffeine can be added to various embodiments of the beverages disclosed here. The amount of caffeine added is determined by the desired beverage properties, any applicable regulatory provisions of the country where the beverage is to be marketed, etc. In certain exemplary embodiments caffeine is included at a level of 0.02 percent or less by weight of the beverage. The caffeine must be of a purity acceptable for use in foods and beverages. Preferably, the caffeine is natural in origin.

The beverage concentrates and beverages disclosed here optionally may contain other additional ingredients, including, generally, any of those typically found in beverage formulations. These additional ingredients, for example, can typically be added to a stabilized beverage concentrate. Examples of such additional ingredients include, but are not limited to, caramel class i and concentrated apple extract and other natural colorants, natural antifoaming agents, gums, emulsifiers, tea solids, cloud components, and mineral and non-mineral nutritional supplements. Examples of non-mineral nutritional supplement ingredients are known to those of ordinary skill in the art and include, for example, antioxidants and vitamins, including vitamins a, d, e (tocopherol), c (ascorbic acid), b (thiamine), $b_2$ (riboflavin), $b_6$, $b_{12}$, and k, niacin, folic acid, biotin, and combinations thereof. The optional non-mineral nutritional supplements are typically present in amounts generally accepted under good manufacturing practices. Exemplary amounts are between about 1% and about 100% rdv, where such rdv are established. In certain exemplary embodiments the non-mineral nutritional supplement ingredient(s) are present in an amount of from about 5% to about 20% rdv, where established.

Preservatives may be used in at least certain embodiments of the beverages disclosed here. That is, at least certain exemplary embodiments contain an optional dissolved preservative system. Natural beverage product embodiments employ only natural preservatives. Solutions with a pH below 4.0 and especially those below 3.0, e.g., 2.5 typically are "microstable," i.e., they resist growth of microorganisms, and so are suitable for longer term storage prior to consumption without the need for further preservatives. However, an additional preservative system can be used if desired. If a preservative system is used, it can be added to the beverage product at any suitable time during production, e.g., in some cases prior to the addition of the sweetener. As used here, the terms "preservation system" or "preservatives" include all suitable natural preservatives approved for use in food and beverage compositions, including, without limitation, such known preservatives as nisin, cinnamic acid, citrates, e.g., sodium citrate and potassium citrate, and antioxidants such as ascorbic acid, and combinations thereof. Preservatives can be used in amounts not exceeding mandated maximum levels under applicable laws and regulations. The level of preservative used typically is adjusted according to the planned final product pH, as well as an evaluation of the microbiological spoilage potential of the particular beverage formulation. The maximum level employed typically is about 0.05% by weight of the beverage. It will be within the ability of those skilled in the art, given the benefit of this disclosure, to select a suitable preservative or combination of preservatives for beverages according to this disclosure.

Other methods of beverage preservation suitable for at least certain exemplary embodiments of the beverage products disclosed here include, e.g., aseptic packaging and/or heat treatment or thermal processing steps, such as hot filling and tunnel pasteurization. Such steps can be used to reduce yeast, mold and microbial growth in the beverage products. For example, U.S. Pat. No. 4,830,862 to Braun et al. Discloses the use of pasteurization in the production of fruit juice beverages as well as the use of suitable preservatives in carbonated beverages. U.S. Pat. No. 4,925,686 to Kastin discloses a heat-pasteurized freezable fruit juice composition which contains sodium benzoate and potassium sorbate. In general, heat treatment includes hot fill methods typically using high temperatures for a short time, e.g., about 190° F. for 10 seconds, tunnel pasteurization methods typically using lower temperatures for a longer time, e.g., about 160° F. for 10-15 minutes, and retort methods typically using, e.g., about 250° F. for 3-5 minutes at elevated pressure, i.e., at pressure above 1 atmosphere.

EXAMPLES

The following examples are specific embodiments of the present invention but are not intended to limit it.

Example 1: A Natural Cola Beverage

| Ingredients | Weight (g) |
| --- | --- |
| Liquid sucrose | 985.5 |
| Citric acid, anhydrous | 3.745 |
| Tartaric acid | 0.245 |
| Lactic acid | 0.277 |
| Natural caffeine | 0.639 |
| Caramel color, class i | 7.969 |
| Concentrated apple extract | 30.0 |
| Natural cola flavors | 4.618 |
| Treated water | Quantity sufficient for 1 liter total volume |

A natural cola beverage according to this disclosure was prepared by dissolving the above ingredients with vigorous stirring in sufficient water to obtain 1 liter of syrup. The syrup was diluted with carbonated water in a 1 plus 5 "throw" (one volume of syrup plus five volumes of carbonated water) to produce a finished beverage. The cola beverage was then subjected to tunnel pasteurization at 155° F. for 10 minutes. The cola beverage had a pH of about 3.20, a titratable acidity of about 12.8, and a brix of about 11.3. The beverage made according to this example was judged by 6 cola beverage experts to have a very good cola taste.

Example 2: A Natural 25% Reduced Calorie Cola Beverage

| Ingredients | Weight (g) |
| --- | --- |
| Sucrose | 474.2 |
| Lo han guo juice concentrate | 6.0 |
| Citric acid, anhydrous | 3.01 |
| Tartaric acid | 0.49 |
| Lactic acid | 0.85 |
| Natural caffeine | 0.64 |
| Caramel color, class i | 7.99 |
| Concentrated apple extract | 30.0 |
| Natural cola flavors | 4.62 |
| Treated water | Quantity sufficient for 1 liter total volume |

A natural reduced calorie cola beverage according to this disclosure was prepared by dissolving the above ingredients with vigorous stirring in sufficient water to obtain 1 liter of syrup. The syrup was diluted with carbonated water in a 1 plus 5 "throw" (one volume of syrup plus five volumes of carbonated water) to produce a finished beverage. The reduced calorie cola beverage was then subjected to tunnel pasteurization at 155° f. for 10 minutes. The reduced calorie cola beverage had a pH of about 3.39, a titratable acidity of about 14.43, and a brix of about 8.32. The beverage made according to this example was judged by 6 cola beverage experts to have a very good cola taste.

Example 3: A Natural Diet Cola Beverage

| Ingredients | Weight (g) |
|---|---|
| Rebaudioside a (98% purity) | 3.0 |
| Erythritol | 210.0 |
| Citric acid, anhydrous | 3.745 |
| Tartaric acid | 0.245 |
| Lactic acid | 0.277 |
| Natural caffeine | 0.639 |
| Caramel color, class i | 8.0 |
| Concentrated apple extract | 30.0 |
| Natural cola flavors | 4.618 |
| Treated water | Quantity sufficient for 1 liter total volume |

A natural diet cola beverage according to this disclosure was prepared by dissolving the above ingredients with vigorous stirring in sufficient water to obtain 1 liter total volume. The syrup was diluted with carbonated water in a 1 plus 5 "throw" (one volume of syrup plus five volumes of carbonated water) to produce a finished beverage. The diet cola beverage was then subjected to tunnel pasteurization at 155° f. for 10 minutes. The diet cola beverage had a pH of about 3.20, and a titratable acidity of about 13.8. The beverage made according to this example was judged by 6 cola beverage experts to have a very good cola taste.

Given the benefit of the above disclosure and description of exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) In this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:

1. A natural cola beverage comprising only natural ingredients including at least a sweetening amount of rebaudioside D, a natural sweetener, natural cola flavoring, a colorant comprising caramel class I and concentrated apple extract, and an acidulant comprising lactic acid and at least one of tartaric acid and citric acids, and optionally other natural carboxylic acids, wherein the acidulant contains no phosphoric acid.

2. A natural beverage product comprising:
    (a) water;
    (b) a sweetener comprising a natural nutritive sweetener consisting essentially of sucrose and a natural non-nutritive sweetener consisting essentially of a sweetening amount of rebaudioside D;
    (c) an acidulant consisting essentially of lactic acid, tartaric and citric acids;
    (d) a colorant comprising caramel class I and concentrated apple extract effective to provide a brown cola appearance;
    (e) cola flavor; and
    (f) caffeine.

* * * * *